US009032486B2

(12) United States Patent
Burke et al.

(10) Patent No.: US 9,032,486 B2
(45) Date of Patent: May 12, 2015

(54) BREATHALYZER SYSTEM FOR SOCIAL MEDIA

(71) Applicants: Michael Patrick Burke, West Long Branch, NJ (US); Daniel Farkas, St. Petersburg, FL (US)

(72) Inventors: Michael Patrick Burke, West Long Branch, NJ (US); Daniel Farkas, St. Petersburg, FL (US)

( * ) Notice: Subject to any disclaimer, the term of this patent is extended or adjusted under 35 U.S.C. 154(b) by 0 days.

(21) Appl. No.: 13/650,075

(22) Filed: Oct. 11, 2012

(65) Prior Publication Data

US 2014/0109185 A1  Apr. 17, 2014

Related U.S. Application Data

(60) Provisional application No. 61/545,997, filed on Oct. 11, 2011.

(51) Int. Cl.
| | |
|---|---|
| *G06F 7/04* | (2006.01) |
| *H04L 9/32* | (2006.01) |
| *G06F 15/173* | (2006.01) |
| *G06Q 99/00* | (2006.01) |
| *H04L 29/06* | (2006.01) |
| *G06F 21/62* | (2013.01) |
| *G06F 21/12* | (2013.01) |
| *H04L 29/08* | (2006.01) |
| *G06Q 50/00* | (2012.01) |

(52) U.S. Cl.
CPC ............ *H04L 63/08* (2013.01); *H04L 63/0861* (2013.01); *H04L 63/102* (2013.01); *G06F 21/6245* (2013.01); *G06F 21/121* (2013.01); *H04L 29/0602* (2013.01); *H04L 29/08099* (2013.01); *G06Q 50/01* (2013.01)

(58) Field of Classification Search
CPC ... H04L 63/08; H04L 63/0861; H04L 63/102; H04L 29/0602; H04L 29/08099; G06F 21/6245; G06F 21/121; G06Q 50/01
USPC .......... 726/4, 27; 713/168; 709/225; 705/319
See application file for complete search history.

(56) References Cited

U.S. PATENT DOCUMENTS

| | | | |
|---|---|---|---|
| 2010/0328066 A1* | 12/2010 | Walker et al. ................. | 340/540 |
| 2011/0191257 A1* | 8/2011 | Bernard et al. ............... | 705/319 |
| 2013/0080544 A1* | 3/2013 | Lyons .......................... | 709/206 |

OTHER PUBLICATIONS

Firthy, Niall, "The Social Media Sobriety Test: New web app stops you posting on Facebook and Twitter if you're too drunk", Nov. 2010.*

* cited by examiner

*Primary Examiner* — Aravind Moorthy
(74) *Attorney, Agent, or Firm* — John Alumit

(57) ABSTRACT

A breathalyzer system for use with a computer consisting of a breathalyzer, computer software and hardware, an interface and method for delaying posts by persons who cannot prove sobriety upon initial posting. The breathalyzer registers the level of sobriety, and the result is sent through an interface to the software. If the alcohol level is below an acceptable threshold, unencumbered access to the social media is granted. If the alcohol level is above an acceptable threshold, access to websites, posting on social media websites, uploading videos, online gambling, or making large purchases is restricted.

12 Claims, 4 Drawing Sheets

BREATHALYZER SYSTEM FOR SOCIAL MEDIA

CROSS-REFERENCE TO RELATED APPLICATION

This present application claims the benefit of Provisional Application No. 61/545,997 filed Oct. 11, 2011. The prior application is incorporated herein by reference.

FEDERALLY SPONSORED RESEARCH

Not Applicable

SEQUENCE LISTING OR PROGRAM

Not Applicable

BACKGROUND

The invention comprises a system, method, and apparatus for regulating posts to social media networks by persons with a history of intoxication. Currently, restrictions for making posts to social media relate to age requirements, and are largely based on the honor system. If a person uses obscenities, posts pornography, or misrepresents their identity, a content administrator may penalize the user or block their posts after the fact. Otherwise, the user is largely free to post what they desire.

As a result of this freedom, persons who are intoxicated are also free to post on social media, even though they may not be in the right frame of mind. Posting while intoxicated often causes damage to relationships, reputations, and careers. Because social networks do not regulate the ability to post while intoxicated, nor by law, it is incumbent upon a person with a history of intoxication to regulate his or her own conduct when participating in social media networks. This is difficult because a drinker sometimes does not know when he or she may be too intoxicated to participate in social media networks. For the foregoing reasons, there is a need for a breathalyzer system that can provide a means for limiting a person's own access to social media networks while intoxicated.

SUMMARY

The breathalyzer system consists of a breathalyzer, computer software and hardware, standard interfaces, and a method for delaying posts by persons who cannot prove sobriety upon initial posting. To post on a social network, the software will require a user to prove sobriety. This is accomplished by blowing into a breathalyzer connected to a user's computer. The breathalyzer registers the level of sobriety, and the result is sent through an interface to the software. If the alcohol level is below an acceptable threshold, for example, below 0.07%, the software will grant unencumbered access to the social media. If the alcohol level is above the acceptable threshold, the software will block and buffer the user's posts for a later time.

The intoxicated person may not know whether the post was successful. When the user later proves sobriety by blowing into the breathalyzer and registering an acceptable level of sobriety (below the acceptable threshold), the software will prompt the user to approve or deny posts made while he or she registered above the acceptable threshold (while he or she was intoxicated). The software can also intercept outbound emails and can send an alternate post instead. Intercepted posts and uploads will be buffered for review at a later time by the user.

DRAWINGS

FIG. 2B is a continuation of FIG. 2A.

DESCRIPTION

Figure 1:
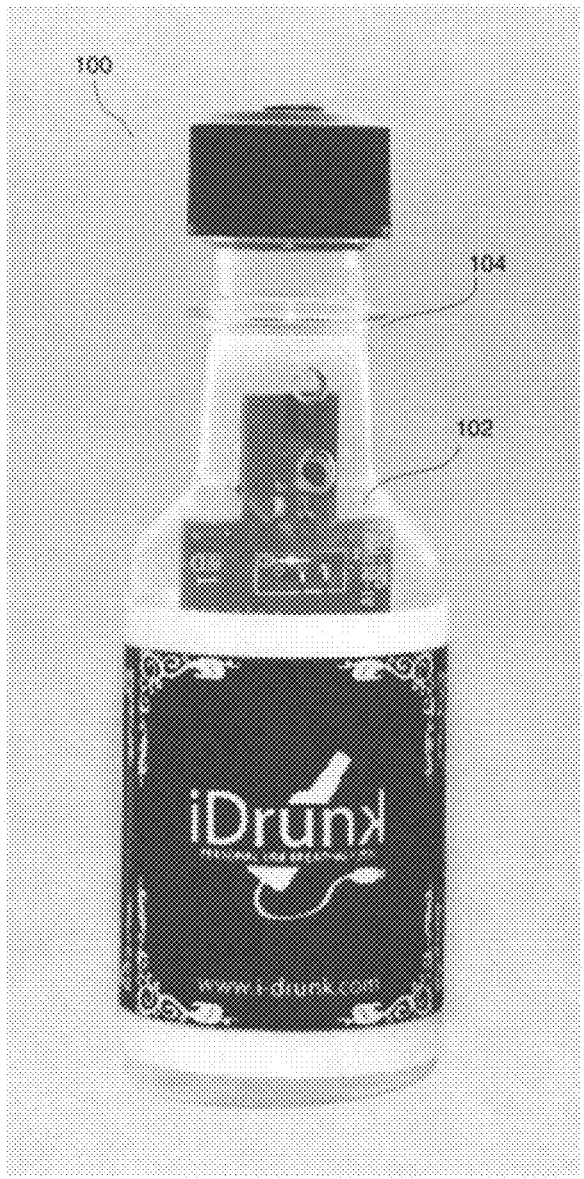
FIG. 1 is a perspective view of a breathalyzer system according to one embodiment of the present invention.
Figure 2A:
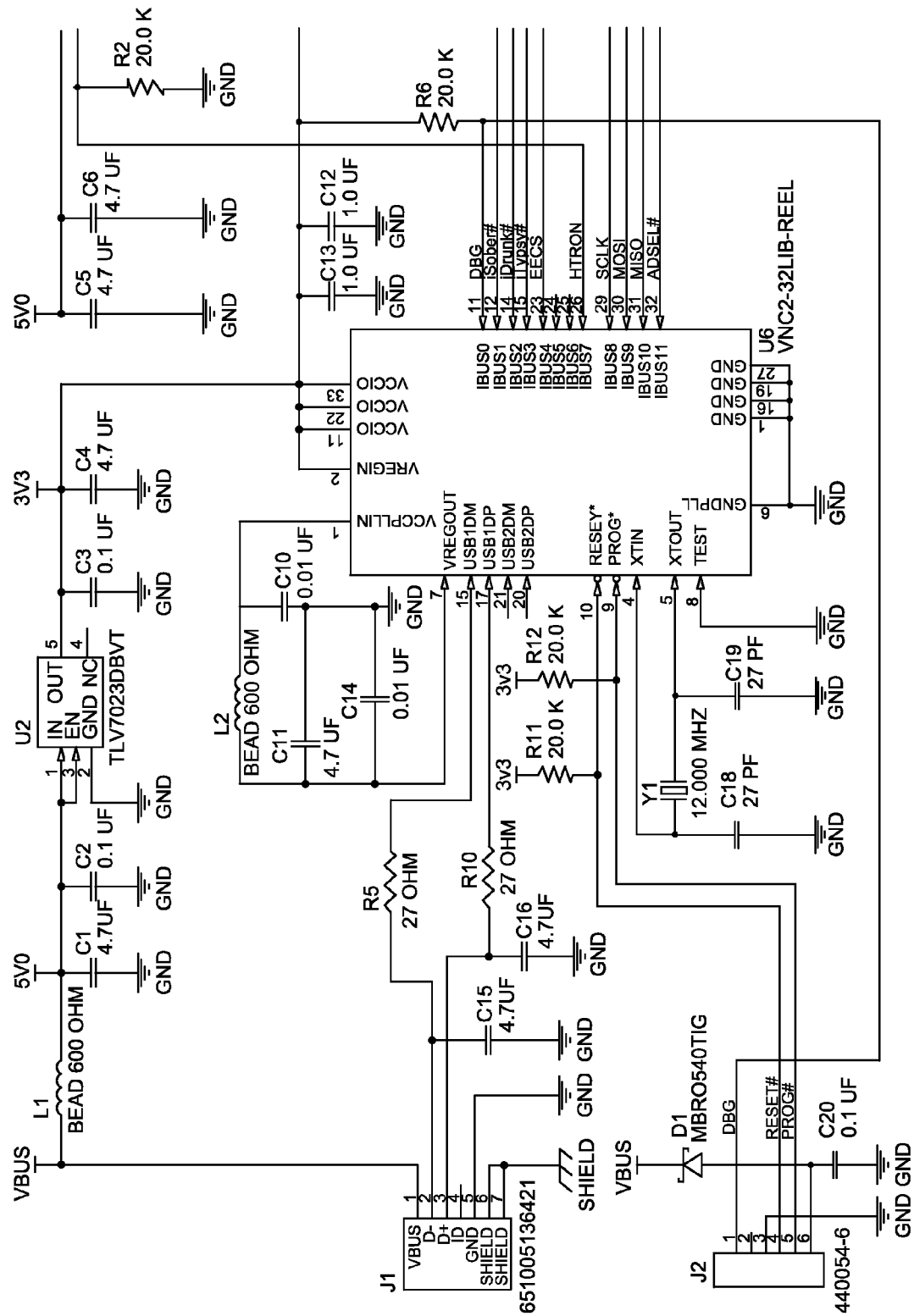
FIGS. 2A and 2B shows a circuit diagram of a preferred embodiment of this invention.
Figure 2B:
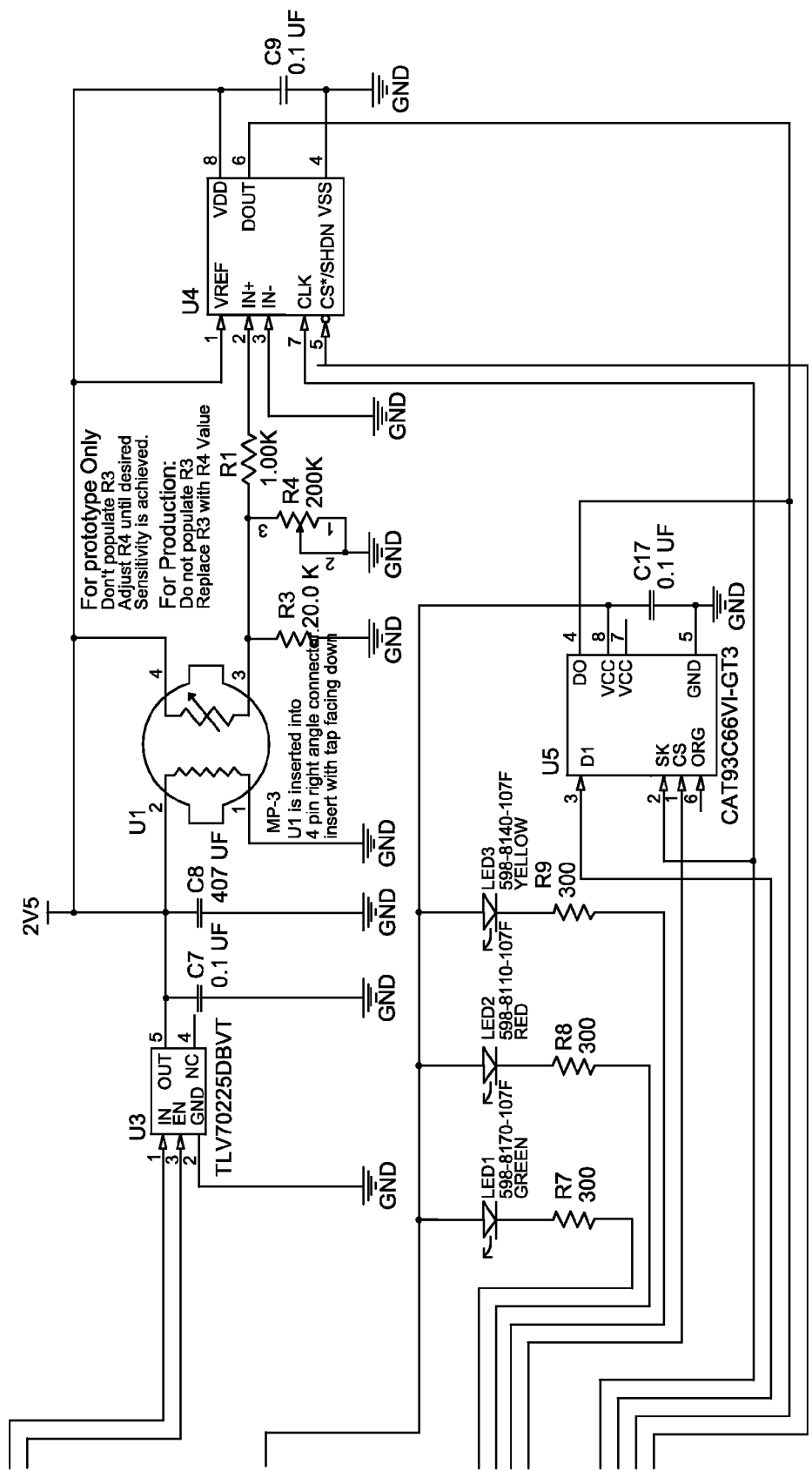
Figure 3:
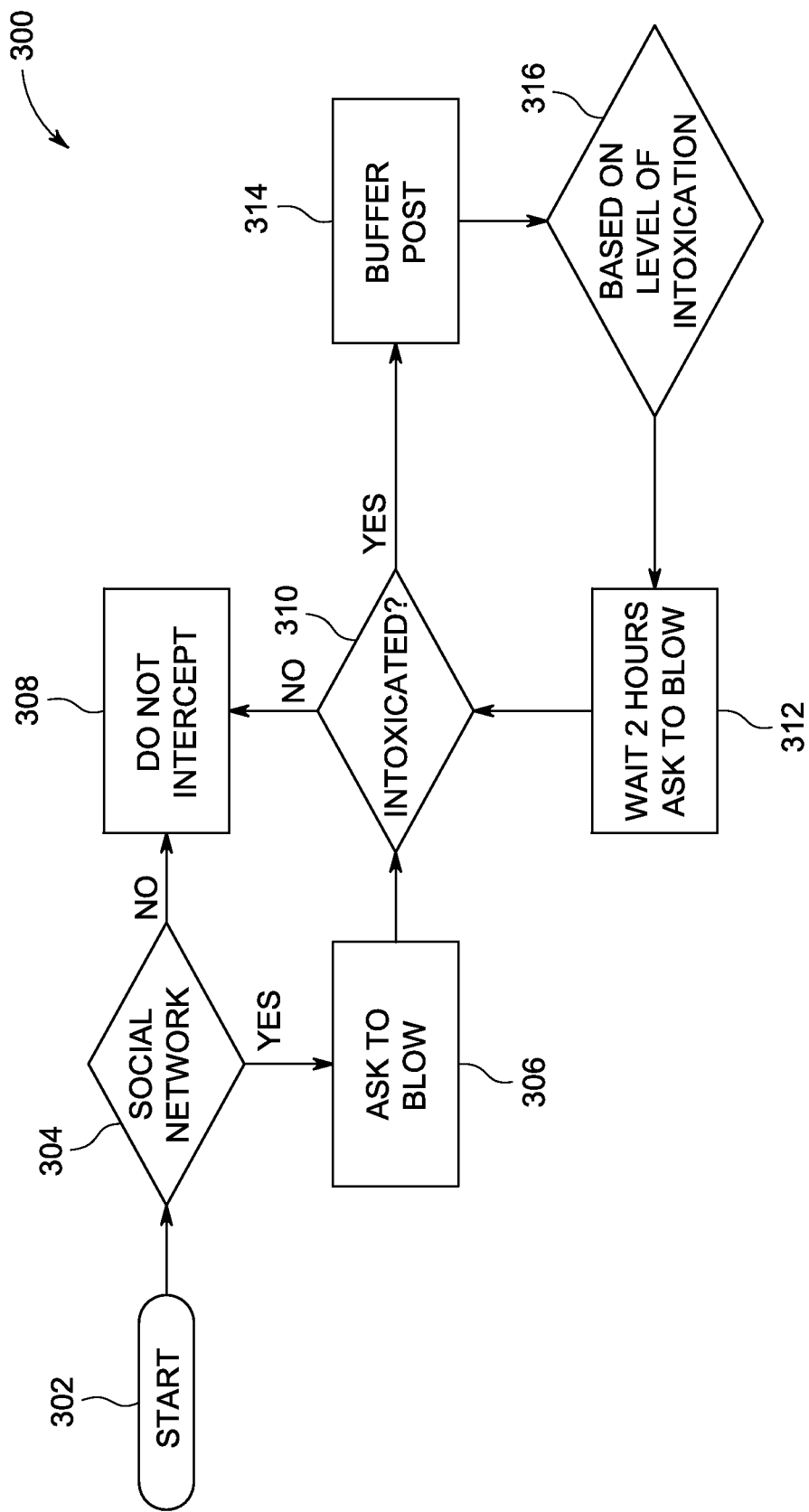
FIG. 3 is a flowchart of a preferred embodiment of this invention illustrating the sequence of software operation.

As illustrated in FIGS. 1-3, the breathalyzer system is comprised of a breathalyzer 100 and computer software with standard interfaces that uses a method for delaying posts by persons who cannot prove sobriety upon initial posting. The "breathalyzer" 100 is the unit that the person blows into and houses a printed circuit board and a means for communicating with the computer. The computer software provides an interface where functions of the breathalyzer system are carried out. Because each person may have a different breath-alcohol threshold before intoxication occurs, each user can set his or her level in the system upon installation, or whenever the software registers an alcohol threshold level below a currently set alcohol threshold level. Alternatively, the computer software may be set to recognize intoxication levels set by law.

The breathalyzer shown in FIG. 1. The breathalyzer housing 104 can be in the form of a 50 ml plastic alcoholic nip bottle or any other shape suitable for containing the device's hardware 102. The hardware 102 includes an alcohol/ethanol sensor, a microcontroller, a micro-USB port, a rechargeable battery, an Electrically Erasable Programmable Read-Only Memory chip (EEPROM), light emitting diodes (LEDs), and Bluetooth or IEEE 802.11 connectivity. Now referring to circuit diagram in FIG. 2, the printed circuit board comprises the system electronics and analyzes the alcohol/ethanol content in the user's breath. The information is communicated to the computer through the USB port, Bluetooth, or an 802.11 connection.

FIG. 3 shows a flowchart, illustrating how the breathalyzer system software functions with regard to its environment. When the user starts their computer 302, the breathalyzer system is activated. If the user attempts to enter or use an "alcohol-sensitive" website 304 (i.e., one that has been designated as posing a risk of danger or embarrassment to the user when used while intoxicated), the system will prompt the user to blow into the breathalyzer 306. Alochol-sensitive websites can be determined by the user upon installing the breathalyzer system. Alternatively, the breathalyzer system may already recognize commonly used social media such as Twitter or Facebook as alcohol-sensitive website, with the option of designating additional social media websites. Using the breathalyzer may also be required to recover the computer from sleep mode or the screen saver. If the user is accessing a non alcohol-sensitive website, they will be allowed to advance 308. If the user is found to be intoxicated 310, they may be restricted from entering alcohol-sensitive websites, posting on social media such as Twitter or Facebook, uploading videos, online gambling, or making purchases 314 (e.g., Amazon, E-bay, stock market). Alternatively, the system may buffer the intoxicated user's post for one hour before once again testing the user for intoxication. When a user is found to be intoxicated, the device may also provide a list of favorite websites to be used while intoxicated.

Depending on the level of intoxication 316, the breathalyzer system may wait two hours and then ask the user to once again blow into the breathalyzer 312. If the device is removed, all alcohol-sensitive websites and applications will remain inaccessible. Once the user is found to be sober by the breathalyzer system, a log of all buffered posts will be presented to the user. The user may then decide whether to send, delete or save the posts.

The invention does not require that all the advantageous features and all the advantages need to be incorporated into every embodiment of the invention. Although the present invention has been described in considerable detail with reference to certain preferred versions thereof, other versions are possible. Therefore, the spirit and scope of the appended claims should not be limited to the description of the preferred versions contained herein.

What is claimed:

1. A method preventing a computer user from transmitting information while inebriated, comprising the steps of:
   providing a breathalyzer;
   providing a computer with Internet access;
   connecting the breathalyzer to the computer;
   the user selecting a blood alcohol level and communicating the selected blood alcohol level to the breathalyzer;
   the user accessing a social media website and attempting to enter a post thereon;
   the computer restricting access to a social media website, thereby preventing the user's post from appearing on the site;
   the computer prompting the user to use the breathalyzer;
   determining whether or not the user's blood alcohol level is above the selected blood alcohol level; and
   buffering the user's post for a predetermined time if the user's blood alcohol level is above the selected blood alcohol level; and
   presenting the post to the user after the predetermined time and presenting the post on the social media website if the user's blood alcohol level is below the selected blood alcohol level.

2. The method of claim 1, wherein the computer receives input from a user to recognize a blood alcohol level upon installation of software governing the user's ability to post on the social media website.

3. The method of claim 1, wherein the social media website is a website for uploading video or a website for making online purchases.

4. The method of claim 1, wherein the computer delays a post by buffering the post for at least one hour before prompting the user to re-use the breathalyzer, and wherein the computer buffers the post for at least one additional hour if the user's blood alcohol level is above the selected blood alcohol level.

5. The method of claim 1, wherein once the computer registers the user's blood alcohol level as below the selected blood alcohol level, the software presents all buffered posts to the user including the options chosen from the list of sending, deleting, and saving the posts.

6. The method of claim 1 wherein if the computer detects a blood alcohol level above the selected blood alcohol level, the computer provides the user with a list of predetermined websites other than the social media website.

7. The method of claim 1 including a step of providing a breathalyzer having a housing containing a microcontroller, an alcohol sensor, and an electrically erasable programmable read-only memory chip capable of storing data when the breathalyzer is disconnected from the computer and powered off.

8. The method of claim 7 including a step of recording browsing data.

9. The method of claim 1 including a step of connecting the computer to the breathalyzer using a USB connection.

10. The method of claim 1 including a step of connecting the computer to the breathalyzer using a BLUETOOTH® connection.

11. The method of claim 1 including a step of connecting the computer to the breathalyzer using an IEEE 802.11 connection.

12. The method of claim 1 including a step of powering the breathalyzer with a battery.

* * * * *